(12) United States Patent
Kawai

(10) Patent No.: US 8,747,688 B2
(45) Date of Patent: Jun. 10, 2014

(54) GLASS DISK PROCESSING METHOD

(75) Inventor: Hideki Kawai, Kobe (JP)

(73) Assignee: Konica Minolta, Inc., Tokyo (JP)

( * ) Notice: Subject to any disclaimer, the term of this patent is extended or adjusted under 35 U.S.C. 154(b) by 1431 days.

(21) Appl. No.: 11/901,894

(22) Filed: Sep. 19, 2007

(65) Prior Publication Data

US 2008/0307829 A1    Dec. 18, 2008

(30) Foreign Application Priority Data

Sep. 20, 2006  (JP) ................................ 2006-254374
Sep. 20, 2006  (JP) ................................ 2006-254379

(51) Int. Cl.
*C25F 3/00*     (2006.01)
*C03C 15/00*    (2006.01)
*C03C 25/68*    (2006.01)

(52) U.S. Cl.
USPC ............... 216/90; 216/83; 438/689; 438/424; 65/31

(58) Field of Classification Search
USPC .................... 216/83, 90; 438/689, 424; 65/31
See application file for complete search history.

(56) References Cited

U.S. PATENT DOCUMENTS

| | | | | |
|---|---|---|---|---|
| 4,921,341 A | * | 5/1990 | Ace | 351/86 |
| 6,280,294 B1 | * | 8/2001 | Miyamoto | 451/34 |
| 7,488,236 B2 | * | 2/2009 | Shimomura et al. | 451/41 |
| 2002/0108400 A1 | * | 8/2002 | Watanabe et al. | 65/61 |
| 2006/0118521 A1 | | 6/2006 | Miyahara et al. | 216/83 |

FOREIGN PATENT DOCUMENTS

| | | |
|---|---|---|
| JP | 10-212134 A | 8/1998 |
| JP | 11-219521 A | 8/1999 |
| JP | 11-288508 A | 10/1999 |
| JP | 2000-36114 A | 2/2000 |
| JP | 2000036114 A * | 2/2000 |
| JP | 2000-169166 A | 6/2000 |
| JP | 2001-139348 A | 5/2001 |
| JP | 2003-212597 A | 7/2003 |
| JP | 2004-342307 A | 12/2004 |
| JP | 2006-082983 A | 3/2006 |
| JP | 2006-188410 A | 7/2006 |

OTHER PUBLICATIONS

Kusakabe JP 2000036114 Translation.pdf.*
International Search Report (Form PCT/ISA/210) dated Jan. 9, 2008, for counterpart International Application No. PCT/JP2007/068072.
Notification of Transmittal of Translation of the International Preliminary Report on Patentability and Written Opinion Translation mailed Apr. 2, 2009, concerning International Application No. PCT/JP2007/068072 filed on Sep. 18, 2007.

* cited by examiner

*Primary Examiner* — Duy Deo
*Assistant Examiner* — Mahmoud Dahimene
(74) *Attorney, Agent, or Firm* — Cozen O'Connor

(57) ABSTRACT

The present invention provides a method of easily chamfering and polishing an inner peripheral face and an outer peripheral face of a glass disk at low cost. By continuously supplying fresh etchants to an inner peripheral face and an outer peripheral face of a glass disk stacked body in which a plurality of glass disks are stacked, the inner and outer peripheral faces are polished.

12 Claims, 5 Drawing Sheets

GLASS DISK PROCESSING METHOD

This application is based on applications Nos. 2006-254,374 and 2006-254,379 filed in Japan, the contents of which are hereby incorporated by reference.

BACKGROUND OF THE INVENTION

1. Field of the Invention

The present invention relates to a glass disk processing method of polishing the inner and outer peripheral faces of a glass disk stacked body in which a plurality of glass disks are stacked.

2. Description of the Related Art

As a magnetic disk is becoming smaller and having higher density, a glass disk having excellent surface smoothness and excellent mechanical strength is often used for an information recording medium. The glass disk for an information recording medium is generally processed by performing coarse processing using a diamond cutter or a core drill, precision finishing using a diamond wheel, and polishing of the inner and outer peripheral faces of the glass disk with a polishing pad or brush.

In recent years, to record/reproduce information at higher density, the interval between a magnetic head and the recording surface of a glass disk is narrowed. As a result, when the magnetic head travels in the lateral direction, if even a small projection exists, there is the possibility that the magnetic head collides with the side face of the glass disk. To avoid such collision, the corners formed by the upper and lower recording faces and the side face undergo edging process such as chamfering or rounding. A technique is disclosed such that, as the edging process on the corners, the side face is ground with a grinding stone processed in a predetermined shape and, after that, the polishing process is performed by making a polishing pad or brush come into contact with the side peripheral face while supplying a polishing solution. Refer to, for example, Japanese Unexamined Patent Application Publication No. 2004-342,307 (this counterpart is U.S. Pat. No. 6,280,294).

Since the edging process such as chambering or rounding is performed on the corner of each of a glass disk by a dedicated precision machining apparatus, it is troublesome to set the glass disks one by one. In addition, it requires a special dedicated machining apparatus, so that a problem of high cost occurs.

SUMMARY OF THE INVENTION

An object of the present invention is, therefore, to provide a method of easily chamfering and polishing the inner and outer peripheral faces of a glass disk at low cost.

To achieve the object, the present invention provides the following glass disk processing methods.

The present invention provides a glass disk processing method of polishing an inner peripheral face and an outer peripheral face of a glass disk, comprising the steps of:
  stacking glass disks for generating a glass disk stacked body in which a plurality of glass disks are stacked;
  preparing an etchant; and
  continuously supplying an inner-peripheral etchant to the inner peripheral face of the glass disk stacked body and continuously supplying an outer-peripheral etchant to the outer peripheral face of the glass disk stacked body.

According to the method, by continuously supplying fresh etchants to the inner and outer peripheral faces of the glass disk stacked body, the inner and outer peripheral faces are etched and the corners of the inner and outer peripheral faces are rounded. Thus, the polishing process and the chamfering process can be performed simultaneously, and the efficiency of the process of the side peripheral faces can be increased.

Etching capability of the inner-peripheral etchant and that of the outer-peripheral etchant are different from each other, and etching capability of the inner-peripheral etchant is higher than that of the outer-peripheral etchant.

The inner space formed by the inner peripheral surface is narrower than the outer space formed by the outer peripheral surface, so that fresh etchant going around tends to be insufficient. Consequently, the etching capability in the inner space tends to be lower than that in the outer space. By the above-described method, by making the etching capability of the inner-peripheral etchant higher than that of the outer-peripheral etchant, the etching capability in the inner space and that in the outer space become almost equal to each other. Therefore, the uniform chamfering and polishing processes on the inner and outer peripheral faces of the glass disk stacked body can be performed easily at low cost.

The variation in the etching capability is realized by at least one method selected from of variation in density of the etchant, variation in temperature of the etchant, and variation in the kind of an additive.

Fresh etchants are supplied to the inner and outer peripheral faces by a method including at least one of an immersion method, a shower spraying method, a jetting method, and a coating method.

To supply fresh etchants to the inner and outer peripheral faces more uniformly, preferably, relative rotation is performed between the etchants and the glass disk stacked body.

Although the etchant supplier can rotate around the glass disk stacked body, to make the configuration compact, preferably, the glass disk stacked body rotates around a rotary shaft.

The rotary shaft passes through the inner face of the glass disk stacked body.

An inner space is formed between the outer peripheral face of the rotary shaft and the inner peripheral face of the glass disk stacked body, and the etchant is supplied to the inner space.

To supply fresh etchants to the inner and outer peripheral faces more uniformly, preferably, the rotary shaft revolves or linearly-reciprocates.

DESCRIPTION OF THE PREFERRED EMBODIMENT

A first embodiment of a method of processing a glass disk 12 for an information recording medium according to the present invention will be described in detail hereinbelow with reference to FIG. 1.

Figure 1:
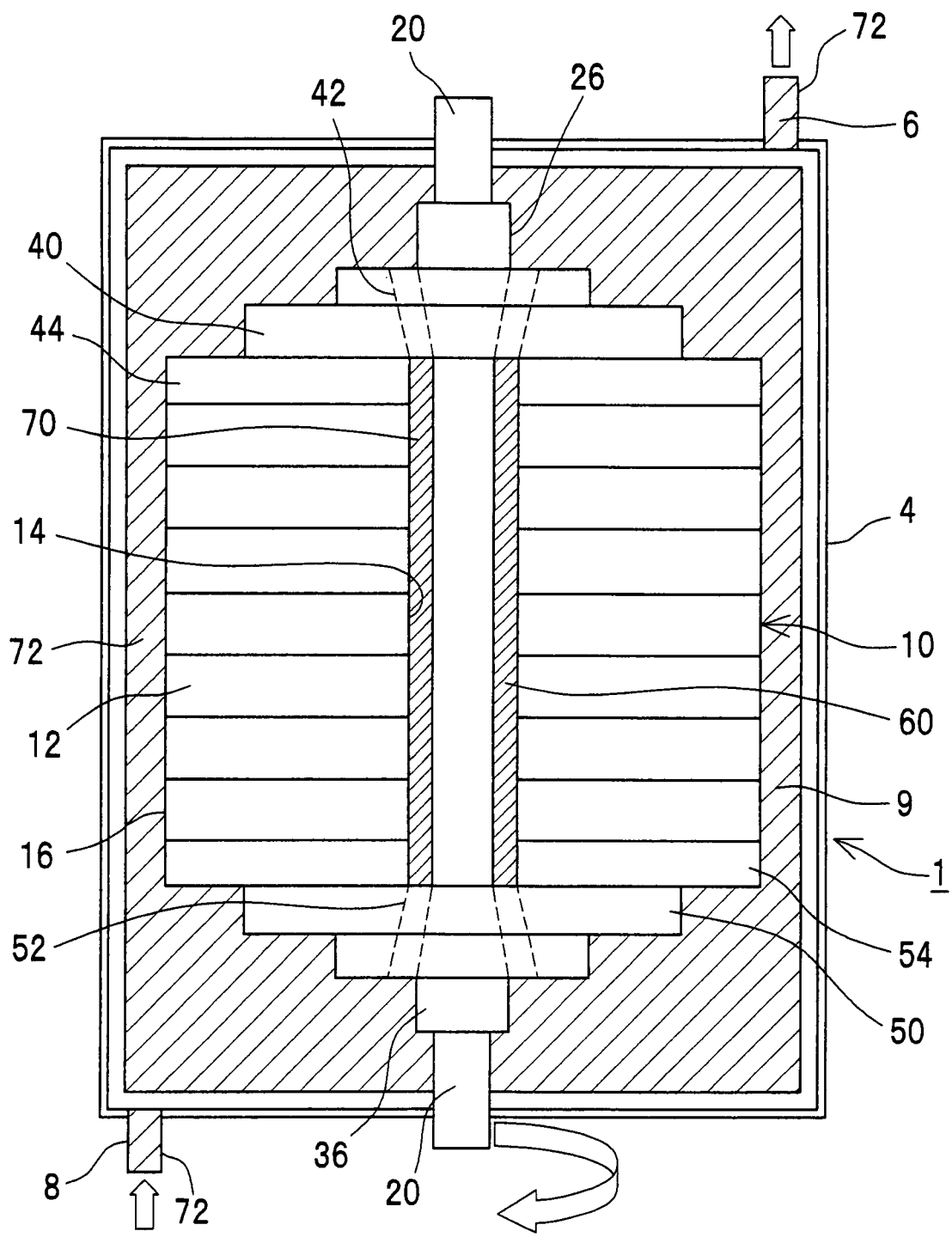
FIG. 1 is a schematic view illustrating a glass disk processing method as a first embodiment of the present invention.

FIG. 1 shows a schematic view showing an embodiment of an immersion-type processor 1 for the glass disk 12.

In the immersion-type processor 1, a glass disk stacked body 10 is hermetically housed in a cylindrical chamber 4 and an inner peripheral face 14 and an outer peripheral face 16 of the glass disk stacked body 10 are polished by continuously supplying a fresh etchant to the inner and outer peripheral faces 14 and 16 of the glass disk stacked body 10.

A distribution path which is communicated with the inside of the chamber 4 is formed by a liquid inlet 8 provided at the left end of the under face of the chamber 4 and a liquid outlet 6 provided at the right end of the top face of the chamber 4. Shaft fixing members 26 and 36 supporting a rotary shaft 20 including the glass disk stacked body 10 are provided in the center of the top face side and the under face side, respectively, of the chamber 4.

The glass disks 12 to be processed have various sizes. For example, the sizes of glass disks for magnetic recording each built in a hard disk drive are 0.85 inch, 1.8 inches, and 2.5 inches. To prevent sliding between neighboring glass disks 12 during process, a disk-shaped spacer layer (having a thickness of, for example, 0.2 mm) or an adhesive layer made of a soft material is interposed between the neighboring glass disks 12. The adhesive layer or spacer layer is made of a soft material such as a resin material or rubber material. In the glass disk stacked body 10, a number of (for example, 10 to 200) glass disks 12 are stacked while sandwiching the adhesive layers or spacer layers between neighboring glass disks 12.

The glass disk stacked body 10 is sandwiched by locking plates 40 and 50 via disk pressing plates 44 and 54 disposed at both ends of the glass disk stacked body 10. The disk pressing plates 44 and 54 and the locking plates 40 and 50 are made of a material having corrosion resistance to an etchant used. As the disk pressing plates 44 and 54, dummy glass disks 12 may be used. In the center of the locking plates 40 and 50, the distribution paths 42 and 52 communicated with the inside of the chamber 4 are provided.

The rotary shaft 20 is driven in the clockwise or counterclockwise direction by a not-shown motor. Accordingly, the glass disk stacked body 10 rotates in the chamber 4 in the immersion-type processor 1. The rotational speed of the rotary shaft 20 is 50 to 2,000 $\text{min}^{-1}$ (rpm).

When the glass disk stacked body 10 is set in the immersion-type processor 1, an inner space 60 is formed between the outer peripheral face of the rotary shaft 20 and the inner peripheral face 14 of the glass disk stacked body 10, and an outer space 9 is formed between the inner peripheral face of the chamber 4 and the outer peripheral face 16 of the glass disk stacked body 10. Therefore, in the immersion-type processor 1, the path of the inner space 60 and the path of the outer space 9 are communicated with each other via the distribution paths 42 and 52.

Etchants 70 and 72 used are made of a fluorinated-acid-based material in which a strong acid such as hydrochloric acid, nitric acid, or sulfuric acid, a weak acid such as carbonic acid, oxalic acid, acetic acid, formic acid, or citric acid, or an additive including hydrofluosilicic acid, ammonium fluoride, or the like is properly added. The density of the etchants is 1 to 50% by weight. The temperature of the etchants is 20 to 80° C. The etching time is 0.1 to 5 hours. The etchant used for etching process is obtained by eliminating residue of the etching and impurities by a filter, and making a check to see whether each of the density and temperature of the liquid lies within a predetermined range or not. If the density or temperature is out of the range, a proper state is set by replenishing the liquid or increasing the temperature, and the etchant is returned to the processor 1 and recycled. The inner-peripheral etchant 70 and the outer-peripheral etchant 72 are basically the same.

The inner-peripheral etchant 70 is introduced from the distribution path 52, passes through the inner space 60, and is exhausted from the distribution path 42. When the inner-peripheral etchant 70 passes through the inner space 60, the flow of the fresh inner-peripheral etchant 70 comes into contact with the inner peripheral face 14 of the glass disk stacked body 10, thereby etching the inner peripheral face 14 of the glass disk stacked body 10. When the inner peripheral face 14 is etched, small projections existing in the inner peripheral face 14 are gradually eliminated and the surface is planarized (polishing process). In addition, the etchant is soaked to a border part defined by the glass disk 12 and an adhesive layer or spacer layer which is in contact with the glass disk 12, so that the corners of the inner peripheral face 14 are gradually removed and rounded (rounding process). Therefore, the inner peripheral face 14 of the glass disk 12 simultaneously undergoes the edging process such as rounding process and the polishing process.

Similarly, the outer-peripheral etchant 72 is introduced from the liquid inlet 8, upwardly passes through the outer space 9, and is discharged from the liquid outlet 6. When the flow of the outer-peripheral etchant 72 passes through the outer space 9, the fresh outer-peripheral etchant 72 comes into contact with the outer peripheral face 16, thereby etching the outer peripheral face 16 of the glass disk stacked body 10. When the outer peripheral face 16 is etched, small projections existing in the outer peripheral face 16 are gradually removed and the outer peripheral face is planarized (polishing process). In addition, the etchant is soaked to a border part defined by the glass disk 12 and an adhesive layer or spacer layer which is in contact with the glass disk 12, so that the corners of the outer peripheral face 16 are gradually removed and rounded (rounding process). Therefore, the outer peripheral face 16 of the glass disk 12 simultaneously undergoes the edging process such as rounding process and the polishing process.

A processing method as a second embodiment of the invention will now be described in detail with reference to FIG. 2. The description of the same points as those of the processing method of the first embodiment will not be repeated. The different points between the processing methods of the first and second embodiments will be mainly described.

Figure 2:
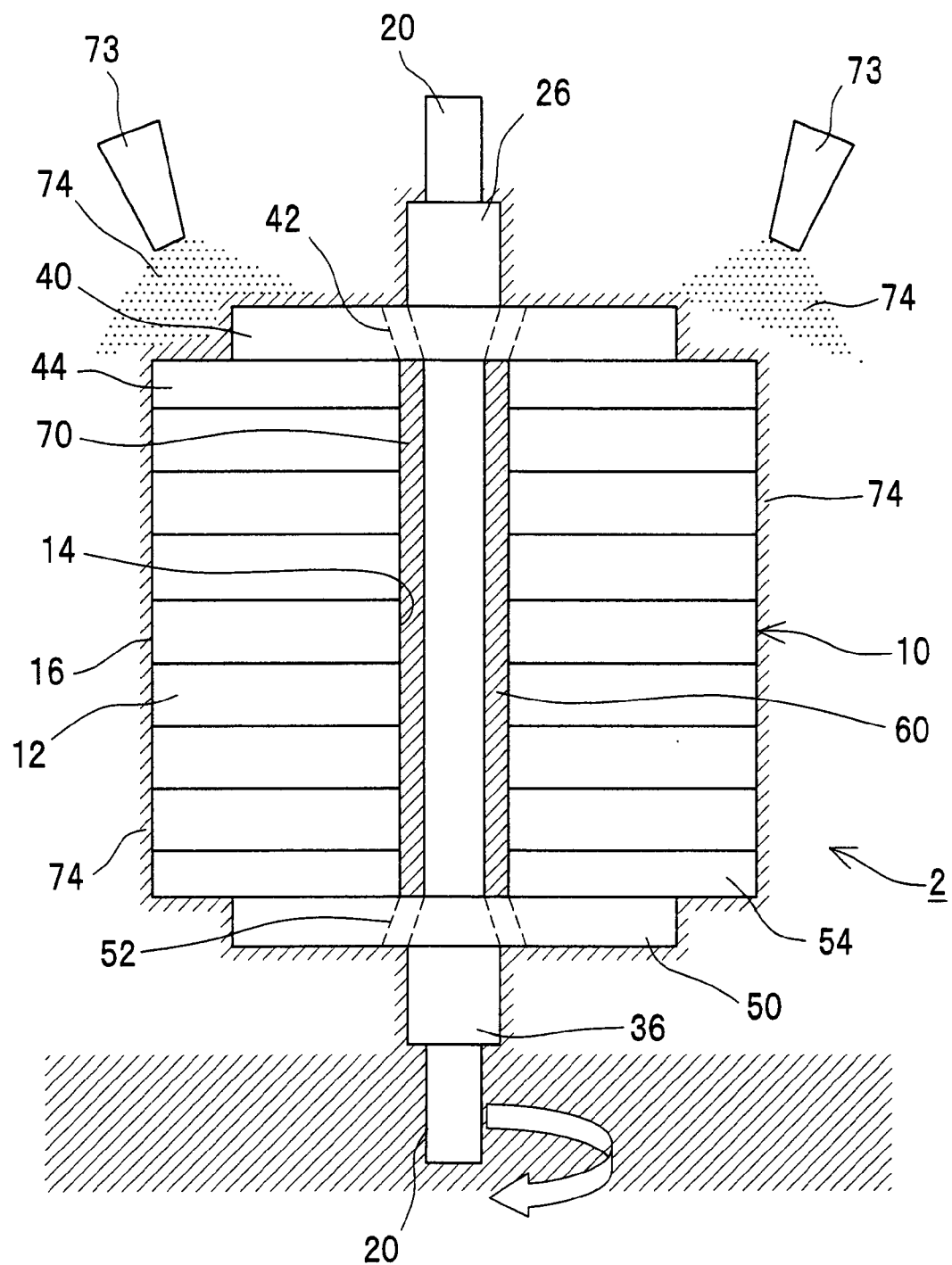
FIG. 2 is a schematic view illustrating a glass disk processing method as a second embodiment of the invention.

FIG. 2 shows a schematic view illustrating an embodiment of a spray-type processor 2 for the glass disk 12.

The spray-type processor 2 supplies the flow of the etchant toward the inner peripheral face 14 of the glass disk stacked body 10 and sprays the etchant like a shower or in the form of a mist to the outer peripheral face 16 of the glass disk stacked body 10, thereby polishing the inner and outer peripheral faces 14 and 16 of the glass disk stacked body 10. By supplying the etchant like a shower or in the form of a mist, the amount of liquid used can be reduced.

The glass disk stacked body 10 is disposed in open or hermetically-closed atmosphere. Sprayer 73 for spraying an outer-peripheral etchant 74 like a shower or in the form of a mist to the outer peripheral face 16 of the glass disk stacked body 10 are provided in positions obliquely above the glass disk stacked body 10. The sprayer 73 has a number of ejection holes. When the size of the ejection hole is large, the outer-peripheral etchant 74 is ejected like a shower. When the size of the ejection hole is small, the outer-peripheral etchant 74 is ejected in the form of a mist. A plurality of the sprayer 73 may be disposed so as to face the outer peripheral face 16 of the glass disk stacked body 10, or disposed in an annular body facing the outer peripheral face 16 of the glass disk stacked body 10.

The shaft fixing members 26 and 36 supporting the rotary shaft 20 including the glass disk stacked body 10 are provided in the center of the top face side and the under face side of the chamber 4. Preferably, the glass disk stacked body 10 is rotated in the clockwise or counterclockwise direction by a not-shown motor. The inner-peripheral etchant 70 and the outer-peripheral etchant 74 are basically the same etchant.

The outer-peripheral etchant 74 is jetted obliquely downward like a shower or in the form of a mist from the sprayer 73. The outer-peripheral etchant 74 jetted like a shower or in the form of a mist makes an upper part of the outer peripheral face 16 of the rotating glass disk stacked body 10 wet. The outer-peripheral etchant 74 making the upper part wet becomes a liquid. The outer-peripheral etchant 74 becoming a liquid drops down along the outer peripheral face 16. Therefore, the entire outer peripheral face 16 of the glass disk stacked body 10 comes into contact with the flow of the fresh outer-peripheral etchant 74. Since the outer-peripheral etchant 74 is jetted sequentially from the sprayer 73, the fresh outer-peripheral etchant 74 is continuously supplied to the outer peripheral face 16, and the outer peripheral face 16 is etched. When the outer peripheral face 16 is etched, small projections existing in the outer peripheral face 16 are gradually removed and the outer peripheral face 16 is planarized (polishing process). In addition, since the etchant is soaked in a border part defined by the glass disk 12 and an adhesive layer or spacer layer which is in contact with the glass disk 12, the corners of the outer peripheral face 16 are gradually removed and rounded (rounding process). Therefore, the outer peripheral face 16 of the glass disk 12 simultaneously undergoes the edging process such as rounding process and the polishing process.

Similarly, the inner-peripheral etchant 70 is introduced from the distribution path 52, passes through the inner space 60, and is discharged from the distribution path 42. When the inner-peripheral etchant 70 passes through the inner space 60, the flow of the fresh inner-peripheral etchant 70 comes into contact with the inner peripheral face 14 of the glass disk stacked body 10, thereby etching the inner peripheral face 14 of the glass disk stacked body 10. When the inner peripheral face 14 is etched, small projections existing in the inner peripheral face 14 are gradually removed and the inner peripheral face 14 is planarized (polishing process). In addition, the etchant is soaked in a border part defined by the glass disk 12 and an adhesive layer or spacer layer which is in contact with the glass disk 12, so that the corners of the inner peripheral face 11 are gradually removed and rounded (rounding process). Therefore, the inner peripheral face 14 of the glass disk 12 simultaneously undergoes the edging process such as rounding process and the polishing process.

A processing method as a third embodiment of the invention will now be described in detail with reference to FIG. 3. The description of the same points as those of the processing methods of the foregoing embodiments will not be repeated. The characteristics of the third embodiment will be mainly described.

Figure 3:
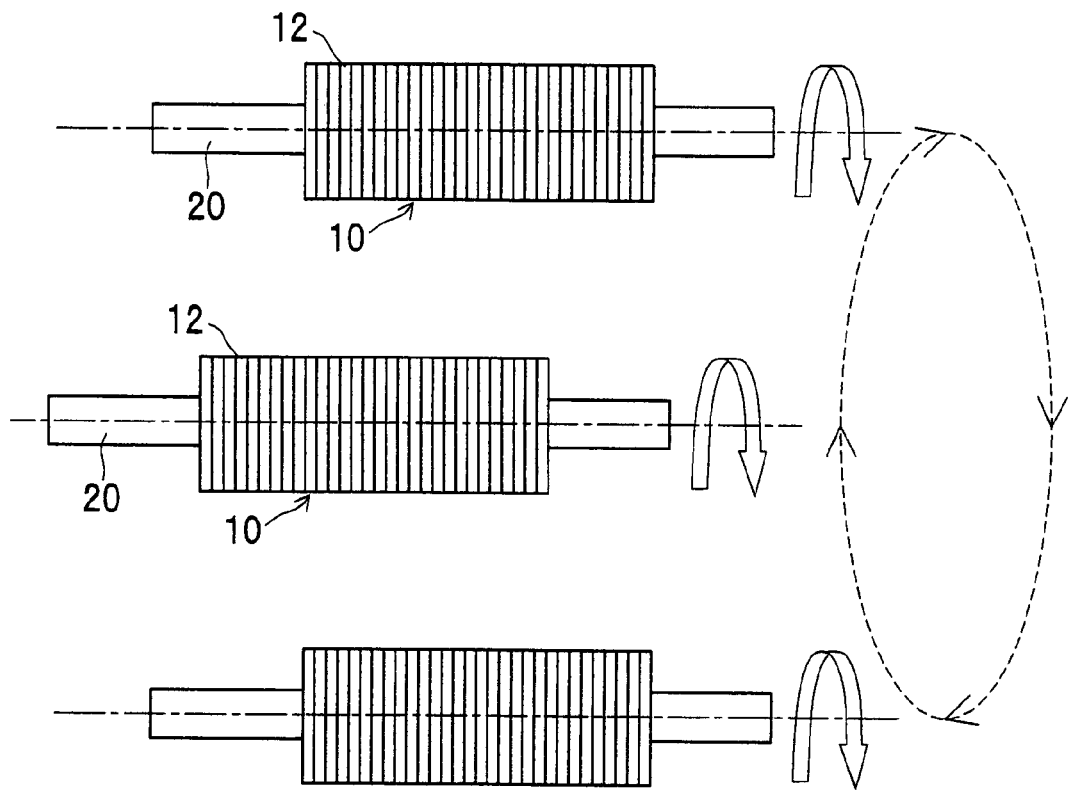
FIG. 3 is a schematic view illustrating a glass disk processing method as third and seventh embodiments of the invention.

FIG. 3 shows a schematic view illustrating an embodiment of the processor for the glass disk 12.

In FIG. 3, the immersion-type processor 1 or the spray-type processor 2 in which the glass disk stacked body 10 revolves, so that the glass disk stacked body 10 is in a sun-and-planet motion. When the glass disk stacked body 10 is in the sun-and-planet motion, the flowability of the etchant which is in contact with the inner and outer peripheral faces 14 and 16 increases. Thus, more uniform etching process can be realized.

Further, a processing method as a fourth embodiment of the invention will now be described in detail with reference to FIG. 4. The description of the same points as those of the processing methods of the foregoing embodiments will not be repeated. The characteristics of the fourth embodiment will be mainly described.

Figure 4:
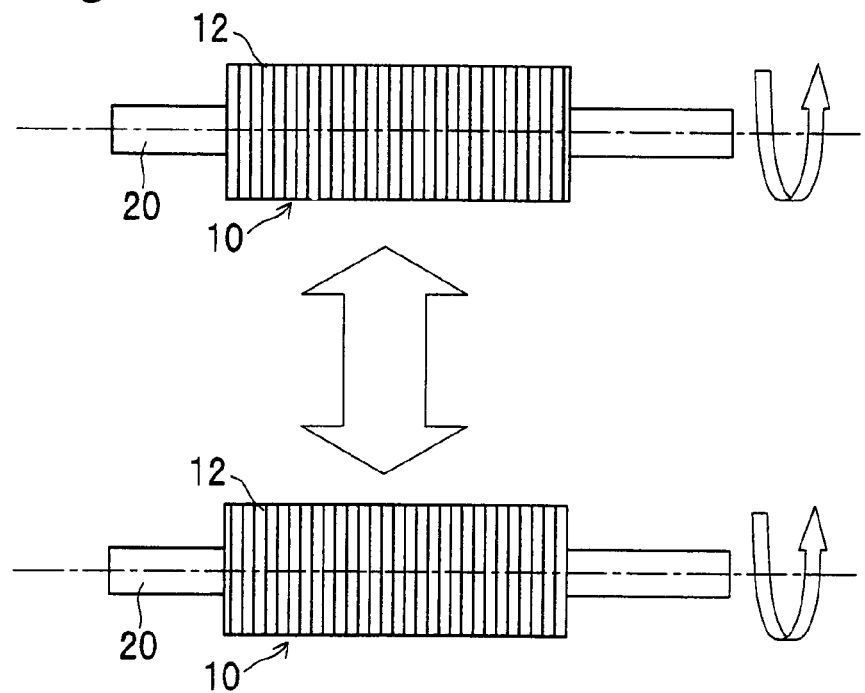
FIG. 4 is a schematic view illustrating a glass disk processing method as fourth and eighth embodiments of the invention.

FIG. 4 shows a schematic view illustrating an embodiment of the processor for the glass disk 12.

In FIG. 4, the immersion-type processor 1 or the spray-type processor 2 in which the glass disk stacked body 10 rotates reciprocates linearly, so that the glass disk stacked body 10 rotates/reciprocates. When the glass disk stacked body 10 rotates/reciprocates, the flowability of the etchant which is in contact with the inner and outer peripheral faces 14 and 16 increases. Thus, more uniform etching process can be realized.

In each of the embodiments shown in FIGS. 3 and 4, the processor is of the horizontal type in which the rotary shaft 20 extends in the horizontal direction. As in the embodiments shown in FIGS. 1 and 2, the processor may be of the vertical type in which the rotary shaft 20 extends in the vertical direction. On the contrary, the vertical-type processors shown in FIGS. 1 and 2 may be of the horizontal type in which the rotary shaft 20 extends in the horizontal direction. The vertical-type processor has an advantage of high rotation precision since application of the load of the glass disks 12 to the rotary shaft 20 is suppressed. On the other hand, it has a disadvantage that the supply of the etchant tends to be nonuniform. In the horizontal-type processor, the load of the glass disks 12 is applied to the rotary shaft 20, so that the rotary precision deteriorates. Consequently, the processor is not suitable to the case where a number of glass disks 12 are stacked. However, the processor has an advantage such that the etchant can be supplied uniformly. By applying the etchant to the inner and outer peripheral faces 14 and 16 of the glass disk stacked body 10, the inner and outer peripheral faces 14 and 16 of the glass disk stacked body 10 can be polished.

A fifth embodiment of a method of processing a glass disk 12 for an information recording medium according to the present invention will be described in detail hereinbelow with reference to FIG. 5.

Figure 5:
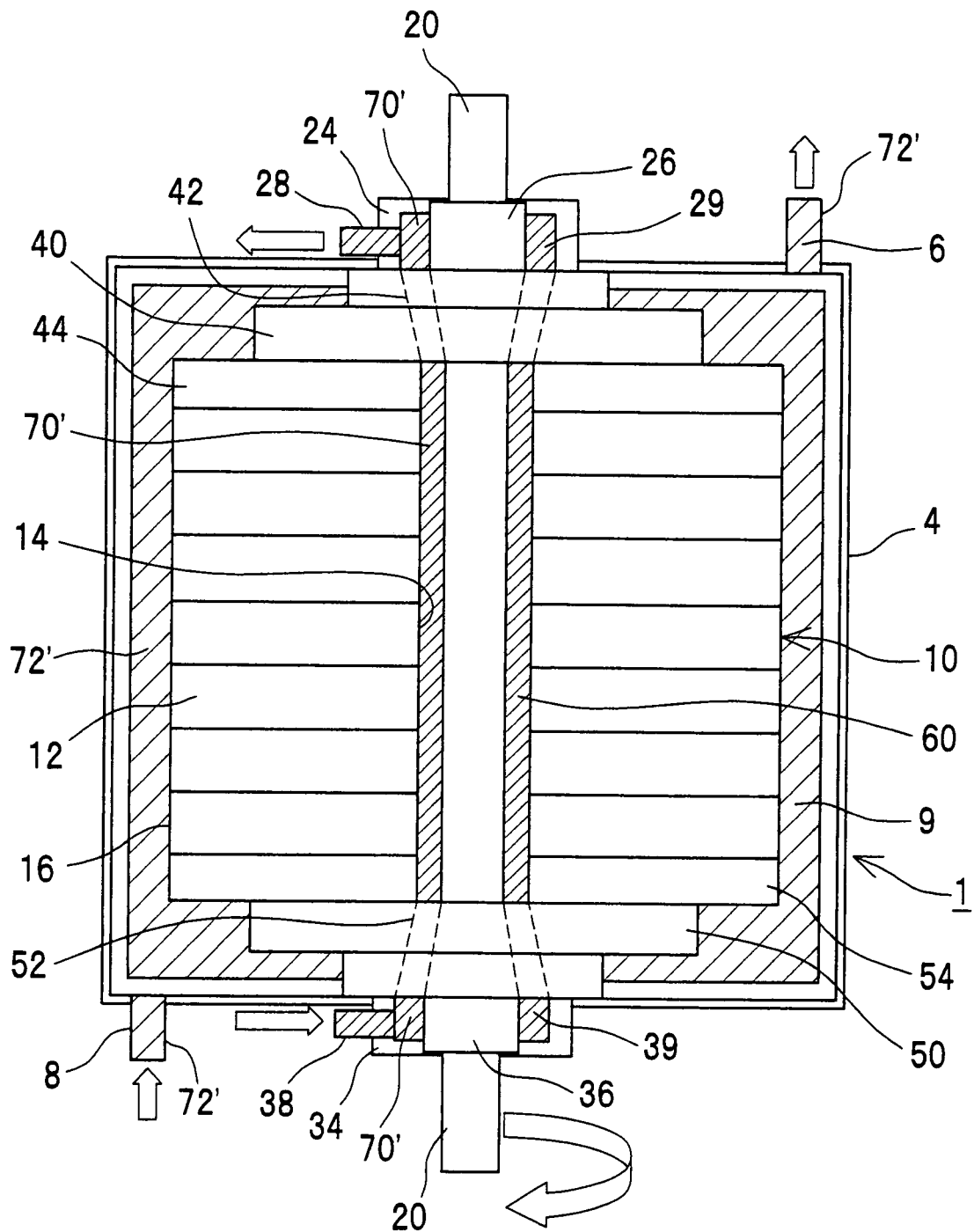
FIG. 5 is a schematic view illustrating a glass disk processing method as a fifth embodiment of the invention.

FIG. 5 shows a schematic view showing an embodiment of an immersion-type processor 1 for the glass disk 12.

In the immersion-type processor 1, a glass disk stacked body 10 is hermetically housed in a cylindrical chamber 4 and an inner peripheral face 14 and an outer peripheral face 16 of the glass disk stacked body 10 are polished by continuously supplying a fresh etchant to the inner and outer peripheral faces 14 and 16 of the glass disk stacked body 10.

An outer-peripheral inlet 8 is provided at the left end of the under face of the chamber 4, and an outer-peripheral outlet 6 is provided at the right end of the top face of the chamber 4. Hermetic shaft supporting members 24 and 34 supporting a rotary shaft 20 including the glass disk stacked body 10 are provided in the center of the top face and the under face, respectively, of the chamber 4. An inner-peripheral inlet 38 is provided in the side face of the hermetic shaft supporting member 34. An inner-peripheral outlet 28 is provided in the side face of the hermetic shaft supporting member 24. The inner-peripheral inlet 38 is communicated with a liquid-pool space 39 formed by the outer wall face of a shaft fixing member 36 and the inner wall face of the hermetic shaft supporting member 34. Similarly, the inner-peripheral outlet 28 is communicated with a liquid-pool space 29 formed by the outer wall face of the shaft fixing member 26 and the inner wall face of the hermetic shaft supporting member 24.

The glass disks 12 to be processed have various sizes. For example, the sizes of glass disks for magnetic recording each built in a hard disk drive are 0.5 inch, 1.8 inches, and 2.5 inches. To prevent sliding between neighboring glass disks 12 during process, a disk-shaped spacer layer (having a thickness of, for example, 0.2 mm) or an adhesive layer made of a soft material is interposed between the neighboring glass disks 12. The adhesive layer or spacer layer is made of a soft material such as a resin material or rubber material. In the glass disk stacked body 10, a number of (for example, 10 to 200) glass disks 12 are stacked while sandwiching the adhesive layers or spacer layers between neighboring glass disks 12.

The glass disk stacked body 10 is sandwiched by locking plates 40 and 50 via disk pressing plates 44 and 54 disposed at both ends of the glass disk stacked body 10. The disk pressing plates 44 and 54 and the locking plates 40 and 50 are made of a material having corrosion resistance to an etchant used. As the disk pressing plates 44 and 54, dummy glass disks 12 may be used. In the center of the locking plates 40 and 50, the distribution paths 42 and 52 communicating an inner space 60 and the liquid-pool spaces 29 and 39 are provided.

The rotary shaft 20 is driven in the clockwise or counter-clockwise direction by a not-shown motor. Accordingly, the glass disk stacked body 10 rotates in the chamber 4 in the immersion-type processor 1. The rotational speed of the rotary shaft 20 is 50 to 2,000 min$^{-1}$ (rpm).

When the glass disk stacked body 10 is set in the immersion-type processor 1, the inner space 60 is formed between the outer peripheral face of the rotary shaft 20 and the inner peripheral face 14 of the glass disk stacked body 10, and an outer space 9 is formed between the inner peripheral face of the chamber 4 and the outer peripheral face 16 of the glass disk stacked body 10. Therefore, in the immersion-type processor 1, the space is divided by the glass disk stacked body 10 to two independent paths; the path (hatched portion) to the inner space 60, and the path to the outer space 9.

The etchant used is made of a fluorinated-acid-based material in which a strong acid such as hydrochloric acid, nitric acid, or sulfuric acid, a weak acid such as carbonic acid, oxalic acid, acetic acid, formic acid, or citric acid, or an additive including hydrofluosilicic acid, ammonium fluoride, or the like is properly added. The density of the etchants is 1 to 50% by weight. The temperature of the etchants is 20 to 80° C. The etching time is 0.1 to 5 hours. The etchant used for etching process is obtained by eliminating residue of the etching and impurities by a filter, and making a check to see whether each of the density and temperature of the liquid lies within a predetermined range or not. If the density or temperature is out of the range, a proper state is set by replenishing the liquid or increasing the temperature, and the etchant is returned to the processor 1 and recycled.

The inner space 60 formed by the inner-peripheral surface 14 is narrower than the outer space 9 formed by the outer-peripheral surface 16, so that fresh etchant going around tends to be insufficient. Consequently, the etching capability in the inner space 60 tends to be lower than that in the outer space 9. Therefore, adjustment is performed so that the etching capability of in an inner-peripheral etchant 70' becomes higher than that of an outer-peripheral etchant 72'. At least one of a change in density of the etchant, a change in temperature, and the kind of an additive, is selected to make a difference between the inner-peripheral etchant 70' and the outer-peripheral etchant 72'. For example, the temperature of the inner-peripheral etchant 70' is set to 50° C. and the temperature of the outer-peripheral etchant 72' is set to 30° C. The density of the inner-peripheral etchant 70' is set to 30% by weight and the density of the outer-peripheral etchant 72' is set to 15% by weight. The inner-peripheral etchant 70' is made of a mixed acid of fluorinated acid and sulfuric acid and the outer-peripheral etchant 72' is made of a mixed acid of fluorinated acid and oxalic acid. Any combination of those methods can be also used.

The inner-peripheral etchant 70' is introduced from the inner-peripheral inlet 38, sequentially passes through the liquid-pool space 39, the distribution path 52, the inner space 60, the distribution path 42, and the liquid-pool space 29, and is discharged from the inner-peripheral outlet 28. When the inner-peripheral etchant 70' passes through the inner space 60, the flow of the fresh inner-peripheral etchant 70' comes into contact with the inner-peripheral face 14 of the glass disk stacked body 10, thereby etching the inner-peripheral face 14 of the glass disk stacked body 10. When the inner-peripheral face 14 is etched, small projections existing in the inner-peripheral face 14 are gradually eliminated and the surface is planarized (polishing process). In addition, the etchant is soaked to a border part defined by the glass disk 12 and an adhesive layer or spacer layer which is in contact with the glass disk 12, so that the corners of the inner-peripheral face 14 are gradually removed and rounded (rounding process). Therefore, the inner peripheral face 14 of the glass disk 12 simultaneously undergoes the edging process such as rounding process and the polishing process.

Similarly, the outer-peripheral etchant 72' is introduced from the outer-peripheral inlet 8, upwardly passes through the outer space 9, and is discharged from the outer-peripheral outlet 6. When the flow of the outer-peripheral etchant 72' passes through the outer space 9, the fresh outer-peripheral etchant 72' comes into contact with the outer-peripheral face 16 of the glass disk stacked body 10, thereby etching the outer-peripheral face 16 of the glass disk stacked body 10. When the outer-peripheral face 16 is etched, small projections existing in the outer peripheral face 16 are gradually removed and the outer peripheral face is planarized (polishing process). In addition, the etchant is soaked to a border part defined by the glass disk 12 and an adhesive layer or spacer layer which is in contact with the glass disk 12, so that the corners of the outer-peripheral face 16 are gradually removed and rounded (rounding process). Therefore, the outer-peripheral face 16 of the glass disk 12 simultaneously undergoes the edging process such as rounding process and the polishing process.

A processing method as a sixth embodiment of the invention will now be described in detail with reference to FIG. 6. The description of the same points as those of the processing method of the first embodiment will not be repeated. The different points between the processing methods of the fifth and sixth embodiments will be mainly described.

Figure 6:
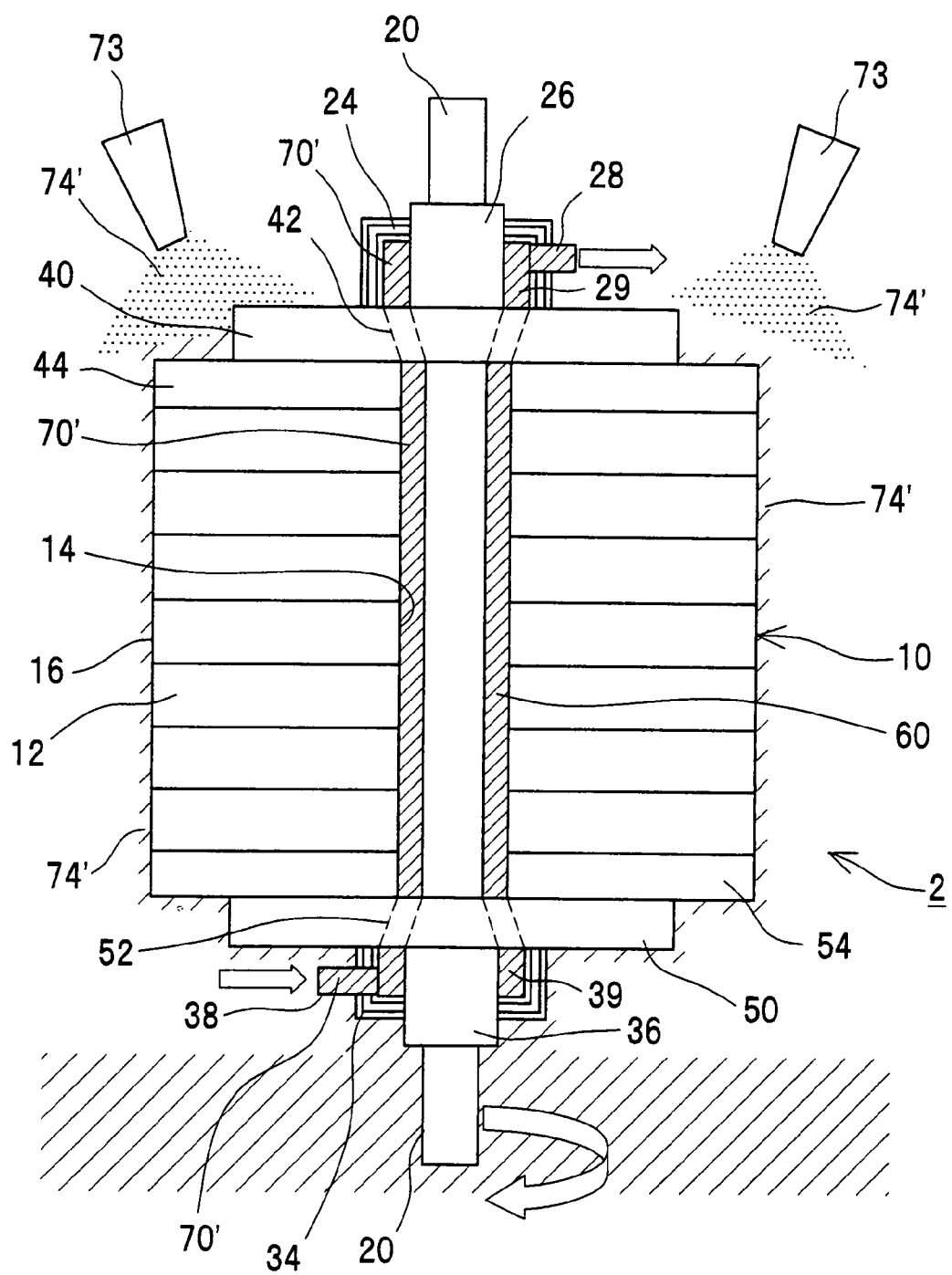
FIG. 6 is a schematic view illustrating a glass disk processing method as a sixth embodiment of the invention.

FIG. 6 shows a schematic view illustrating an embodiment of a spray-type processor 2 for the glass disk 12.

The spray-type processor 2 supplies the flow of the etchant toward the inner peripheral face 14 of the glass disk stacked body 10 and sprays the etchant like a shower or in the form of a mist to the outer peripheral face 16 of the glass disk stacked body 10, thereby polishing the inner and outer peripheral faces 14 and 16 of the glass disk stacked body 10. By supplying the etchant like a shower or in the form of a mist, the amount of liquid used can be reduced.

The glass disk stacked body 10 is disposed in open or hermetically-closed atmosphere. Sprayer 73 for spraying an outer-peripheral etchant 74' like a shower or in the form of a mist to the outer peripheral face 16 of the glass disk stacked body 10 are provided in positions obliquely above the glass disk stacked body 10. The sprayer 73 has a number of ejection holes. When the size of the ejection hole is large, the outer-peripheral etchant 74' is ejected like a shower. When the size of the ejection hole is small, the outer-peripheral etchant 74' is ejected in the form of a mist. A plurality of the sprayer 73 may be disposed so as to face the outer peripheral face 16 of the glass disk stacked body 10, or disposed in an annular body facing the outer peripheral face 16 of the glass disk stacked body 10.

The hermetic shaft supporting members 24 and 34 supporting the rotary shaft 20 including the glass disk stacked body 10 are provided in the center of the top face and the under face of the chamber 4. The inner-peripheral inlet 38 is provided in the side face of the hermetic shaft supporting member 34, and the inner-peripheral outlet 28 is provided in the side face of the hermetic shaft supporting member 24. The inner-peripheral inlet 38 is communicated with the liquid-pool space 39 formed by the outer wall face of the shaft fixing member 36 and the inner wall face of the hermetic shaft supporting member 34. Preferably, the glass disk stacked body 10 is rotated in the clockwise or counterclockwise direction by a not-shown motor.

The outer-peripheral etchant 74' having etching capability lower than that of the inner-peripheral etchant 70' is jetted obliquely downward like a shower or in the form of a mist from the sprayer 73. The outer-peripheral etchant 74' jetted like a shower or in the form of a mist makes an upper part of the outer-peripheral face 16 of the rotating glass disk stacked body 10 wet. The outer-peripheral etchant 74' making the upper part wet becomes a liquid. The outer-peripheral etchant 74' becoming a liquid drops down along the outer peripheral face 16. Therefore, the entire outer-peripheral face 16 of the glass disk stacked body 10 comes into contact with the flow of the fresh outer-peripheral etchant 74'. Since the outer-peripheral etchant 74' is jetted sequentially from the sprayer 73, the fresh outer-peripheral etchant 74' is continuously supplied to the outer-peripheral face 16, and the outer-peripheral face 16 is etched. When the outer-peripheral face 16 is etched, small projections existing in the outer-peripheral face 16 are gradually removed and the outer-peripheral face 16 is planarized (polishing process). In addition, since the etchant is soaked in a border part defined by the glass disk 12 and an adhesive layer or spacer layer which is in contact with the glass disk 12, the corners of the outer peripheral face 16 are gradually removed and rounded (rounding process). Therefore, the outer-peripheral face 16 of the glass disk 12 simultaneously undergoes the edging process such as rounding process and the polishing process.

The inner-peripheral etchant 70' having etching capability higher than that of the outer-peripheral etchant 74' is introduced from the inner-peripheral inlet 38, sequentially passes through the liquid-pool space 39, the distribution path 52, the inner space 60, the distribution path 42, and the liquid-pool space 29, and is discharged from the inner-peripheral outlet 28. When the inner-peripheral etchant 70' passes through the inner space 60, the flow of the fresh inner-peripheral etchant 70' comes into contact with the inner-peripheral face 14 of the glass disk stacked body 10, thereby etching the inner-peripheral face 14 of the glass disk stacked body 10. When the inner-peripheral face 14 is etched, small projections existing in the inner-peripheral face 14 are gradually removed and the inner peripheral face 14 is planarized (polishing process). In addition, the etchant is soaked in a border part defined by the glass disk 12 and an adhesive layer or spacer layer which is in contact with the glass disk 12, so that the corners of the inner-peripheral face 16 are gradually removed and rounded (rounding process). Therefore, the inner-peripheral face 14 of the glass disk 12 simultaneously undergoes the edging process such as rounding process and the polishing process.

A processing method as a seventh embodiment of the invention will now be described in detail with reference to FIG. 3. The description of the same points as those of the processing methods of the foregoing embodiments will not be repeated. The characteristics of the seventh embodiment will be mainly described.

FIG. 3 shows a schematic view illustrating an embodiment of the processor for the glass disk 12.

In FIG. 3, the immersion-type processor 1 or the spray-type processor 2 in which the glass disk stacked body 10 rotates revolves, so that the glass disk stacked body 10 is in a sun-and-planet motion. When the glass disk stacked body 10 is in the sun-and-planet motion, the flowability of the etchant which is in contact with the inner and outer peripheral faces 14 and 16 increases. Thus, more uniform etching process can be realized.

Further, a processing method as a eighth embodiment of the invention will now be described in detail with reference to FIG. 4. The description of the same points as those of the processing methods of the foregoing embodiments will not be repeated. The characteristics of the eighth embodiment will be mainly described.

FIG. 4 shows a schematic view illustrating an embodiment of the processor for the glass disk 12.

In FIG. 4, the immersion-type processor 1 or the spray-type processor 2 in which the glass disk stacked body 10 rotates reciprocates linearly, so that the glass disk stacked body 10 rotates/reciprocates. When the glass disk stacked body 10 rotates/reciprocates, the flowability of the etchant which is in contact with the inner and outer peripheral faces 14 and 16 increases. Thus, more uniform etching process can be realized.

In each of the embodiments shown in FIGS. 3 and 4, the processor is of the horizontal type in which the rotary shaft 20 extends in the horizontal direction. As in the embodiments shown in FIGS. 5 and 6, the processor may be of the vertical type in which the rotary shaft 20 extends in the vertical direction. On the contrary, the vertical-type processors shown in FIGS. 5 and 6 may be of the horizontal type in which the rotary shaft 20 extends in the horizontal direction. The vertical-type processor has an advantage of high rotation precision since application of the load of the glass disks 12 to the rotary shaft 20 is suppressed. On the other hand, it has a disadvantage that the supply of the etchant tends to be nonuniform. In the horizontal-type processor, the load of the glass disks 12 is applied to the rotary shaft 20, so that the rotary precision deteriorates. Consequently, the processor is not suitable to the case where a number of glass disks 12 are stacked. However, the processor has an advantage such that the etchant can be supplied uniformly. By applying the etchant to the inner and outer peripheral faces 14 and 16 of the glass disk stacked body 10, the inner and outer peripheral faces 14 and 16 of the glass disk stacked body 10 can be polished.

What is claimed is:

1. A glass disk processing method of polishing an inner peripheral face and an outer peripheral face of a glass disk, comprising the steps of:

stacking glass disks about a rotary shaft for generating a glass disk stacked body in which a plurality of glass disks are stacked;

preparing an inner peripheral etchant and an outer peripheral etchant, each comprising a fluorinated acid based material;

continuously supplying the inner-peripheral etchant to the inner peripheral face of the glass disk stacked body via an inner space formed between said inner peripheral face and an outer peripheral face of the rotary shaft; and continuously supplying the outer-peripheral etchant to the outer peripheral face of the glass disk stacked body, wherein an etching rate of the inner-peripheral etchant and an etching rate of the outer-peripheral etchant are different from each other, and the etching rate of the inner-peripheral etchant is higher than the etching rate of the outer-peripheral etchant, and wherein the difference in the etching rate between the inner-peripheral etchant and the outer-peripheral etchant is realized by at least one method selected from variation in density of the fluorinated acid of the inner-peripheral etchant and the outer peripheral etchant, variation in temperature of the inner-peripheral etchant and the outer-peripheral etchant, and variation in the kind of an additive in the inner-peripheral etchant and the outer-peripheral etchant.

2. The glass disk processing method according to claim 1, wherein the steps of supplying the etchants are carried out by a method including at least one of an immersion method, a shower spraying method, a jetting method, and a coating method.

3. The glass disk processing method according to claim 1, wherein relative rotation is performed between the inner- and outer-peripheral etchants and the glass disk stacked body in the steps of supplying the etchants.

4. The glass disk processing method according to claim 3, wherein the glass disk stacked body rotates around the rotary shaft in the steps of supplying the etchants.

5. The glass disk processing method according to claim 4, wherein the rotary shaft passes through the inner face of the glass disk stacked body.

6. The glass disk processing method according to claim 4, wherein the rotary shaft revolves or linearly-reciprocates.

7. A glass disk processing method of polishing an inner peripheral face and an outer peripheral face of a glass disk, comprising the steps of:

stacking glass disks about a rotary shaft for generating a glass disk stacked body in which a plurality of glass disks are stacked;

preparing an inner-peripheral etchant and an outer-peripheral etchant, each comprising a fluorinated acid based material;

continuously supplying the inner-peripheral etchant to the inner peripheral face of the glass disk stacked body via an inner space formed between said inner peripheral face and an outer peripheral face of the rotary shaft; and continuously supplying the outer-peripheral etchant to the outer peripheral face of the glass disk stacked body, wherein the inner-peripheral and outer-peripheral etchants differ with respect to at least one of the following properties: density of the fluorinated acid of the inner-peripheral etchant and the outer-peripheral etchant, temperature of the inner-peripheral etchant and the outer-peripheral etchant, and the kind of an additive used in the inner-peripheral etchant and the outer-peripheral etchant.

8. The glass disk processing method according to claim 7, wherein the steps of supplying the etchants are carried out by a method including at least one of an immersion method, a shower spraying method, a jetting method, and a coating method.

9. The glass disk processing method according to claim 7, wherein relative rotation is performed between the inner- and outer-peripheral etchants and the glass disk stacked body in the steps of supplying the etchants.

10. The glass disk processing method according to claim 9, wherein the glass disk stacked body rotates around the rotary shaft in the steps of supplying the etchants.

11. The glass disk processing method according to claim 7, wherein the rotary shaft passes through the inner face of the glass disk stacked body.

12. The glass disk processing method according to claim 10, wherein the rotary shaft revolves or linearly-reciprocates.

* * * * *